UNITED STATES PATENT OFFICE.

EVAN L. MOORE, OF PHILADELPHIA, PENNSYLVANIA.

COMPOSITION FOR USE AS A PROTECTIVE COATING FOR THE HANDS.

1,149,777.  Specification of Letters Patent.  Patented Aug. 10, 1915.

No Drawing.  Application filed June 26, 1913.  Serial No. 775,943.

*To all whom it may concern:*

Be it known that I, EVAN L. MOORE, a citizen of the United States, residing in Philadelphia, Pennsylvania, have invented an Improved Composition for Use as a Protective Coating for the Hands, of which the following is a specification.

My invention consists of a protective coating designed for application to the hands or other portions of the body before engaging in work involving the use of paints, grease, and the like or any kind of dirty work, for the purpose of preventing the usual soiling of the hands when occupied in such work, and avoiding the further difficulty or the necessity of scraping paint, varnish, and the like, from the hands, or of using a solvent injurious to the skin.

The improved material forming the subject of my invention is entirely innocuous; is water solvent, and resists not only oils, grease, gasolene and the dirt accompanying the same, but also paint, varnish, and, to some extent, acids. It may be removed from the hands, together with any dirt, paint, oil, grease and the like with which they may be superficially coated, by the use of water, hot or cold, with or without any kind of soap.

My improved protective coating material is in the form of a paste or emulsion which is to be applied to the hands and well rubbed in; such material drying out very quickly, and after such application, the hands or other coated portions of the body may be subjected to grease, oil, gasolene, graphite, paint, varnish, and the like, without danger of such objectionable matters adhering to the skin.

My improved protective body comprises a substantially creamy paste or emulsion containing substantially the following ingredients in suitable proportions: Gum tragacanth, glycerin, a starchy body which may include flour, starch and dextrin, coloring matter, a preservative which may supply a perfume or scent, and water.

In preparing the coating material, I may proceed as follows: The gum tragacanth is preferably soaked for a period of ten to twenty-four hours in water; the proportion employed being about seven and one-half to ten pounds of gum tragacanth to from eight to ten and one-half gallons of water. To this paste is added about seven to ten ounces of glycerin to avoid undue hardening of the coating compound, with a small quantity of oil of wintergreen as a preservative, preventing decomposition and mold and adding a perfume or scent, such addition not exceeding one ounce with respect to the preceding quantities, and a small amount of a suitable coloring material, cochineal for instance. In addition to this, I prepare a paste or emulsion of starchy material and water, comprising about three to four gallons of water and eight to eleven pounds of starchy material, which may consist of flour, starch and dextrin in suitable proportions, equal, if desired, but preferably four, four, one, respectively. The water and starchy material, flour, &c., is boiled over a slow fire until a thick paste is formed, free from lumps. The substantially cold body of gum tragacanth, with the glycerin, coloring matter and preservative is then mixed with the starchy paste or emulsion and thoroughly worked by any suitable machine, pug-mill, or the like, until all of the ingredients are thoroughly incorporated into a substantially homogeneous mass.

In practice, I have used with satisfactory results the following ingredients, in the proportions named:

| | | |
|---|---|---|
| Gum tragacanth | $7\frac{1}{2}$ | lbs. |
| Water | $8\frac{1}{8}$ | gals. |
| Glycerin | $7\frac{3}{4}$ | oz. |
| Oil of wintergreen | $\frac{3}{5}$ | oz. |
| Starchy material { Flour, 4 lbs. Starch, 4 lbs. Dextrin, 1 lb. } | 9 | lbs. |
| Water | $3\frac{3}{16}$ | gals. |
| Cochineal (or other coloring matter) to suit taste. | | |

The quantity of gum tragacanth above noted is soaked overnight in the eight and one-eighth gallons of water, and the starchy material noted is cooked to thick paste with the three and three-sixteenths gallons of water.

While these proportions have proved highly successful in practice, I do not wish to be limited to the same.

In use, the protective coating material is spread upon the hands and carefully worked into the same, both upon the palm and the back, into and around the finger nails, and over any portions of the wrists and arms to be involved before commencing any work from which the hands or other parts would be soiled.

This protective covering is not soluble in oil, grease, paint, gasolene, and the like, but is completely soluble in water, and hence after completing a job, all the dirt, grease &c., can be washed off by soap and water, leaving the hands in their original cleanly condition and without in any way affecting or injuring the skin.

When desired for immediate use, the addition of glycerin is not necessary, and its employment is largely, if not entirely, for the purpose of preventing the material hardening. Any suitable coloring material may be employed, and the actual color may be anything agreeable to the eye. In practice, I have colored the product a light pink with the aid of a cochineal solution.

I claim:

1. A water soluble protective coating for the hands, comprising a paste or emulsion containing gum tragacanth, seven to ten pounds, starchy material, nine to twelve pounds, glycerin, seven to ten ounces, and water, eleven to fifteen gallons.

2. A water soluble protective coating for the hands, comprising a paste or emulsion containing gum tragacanth, seven to ten pounds, starchy material, nine to twelve pounds, glycerin, seven to ten ounces, water, eleven to fifteen gallons, oil of wintergreen, one-half to one ounce, and coloring matter.

In testimony whereof, I have signed my name to this specification, in the presence of two subscribing witnesses.

EVAN L. MOORE.

Witnesses:
MURRAY C. BOYER,
WM. A. BARR.